Nov. 5, 1946.                  M. HATTAN                   2,410,441
                            FASTENER ASSEMBLY
                           Filed Jan. 11, 1944
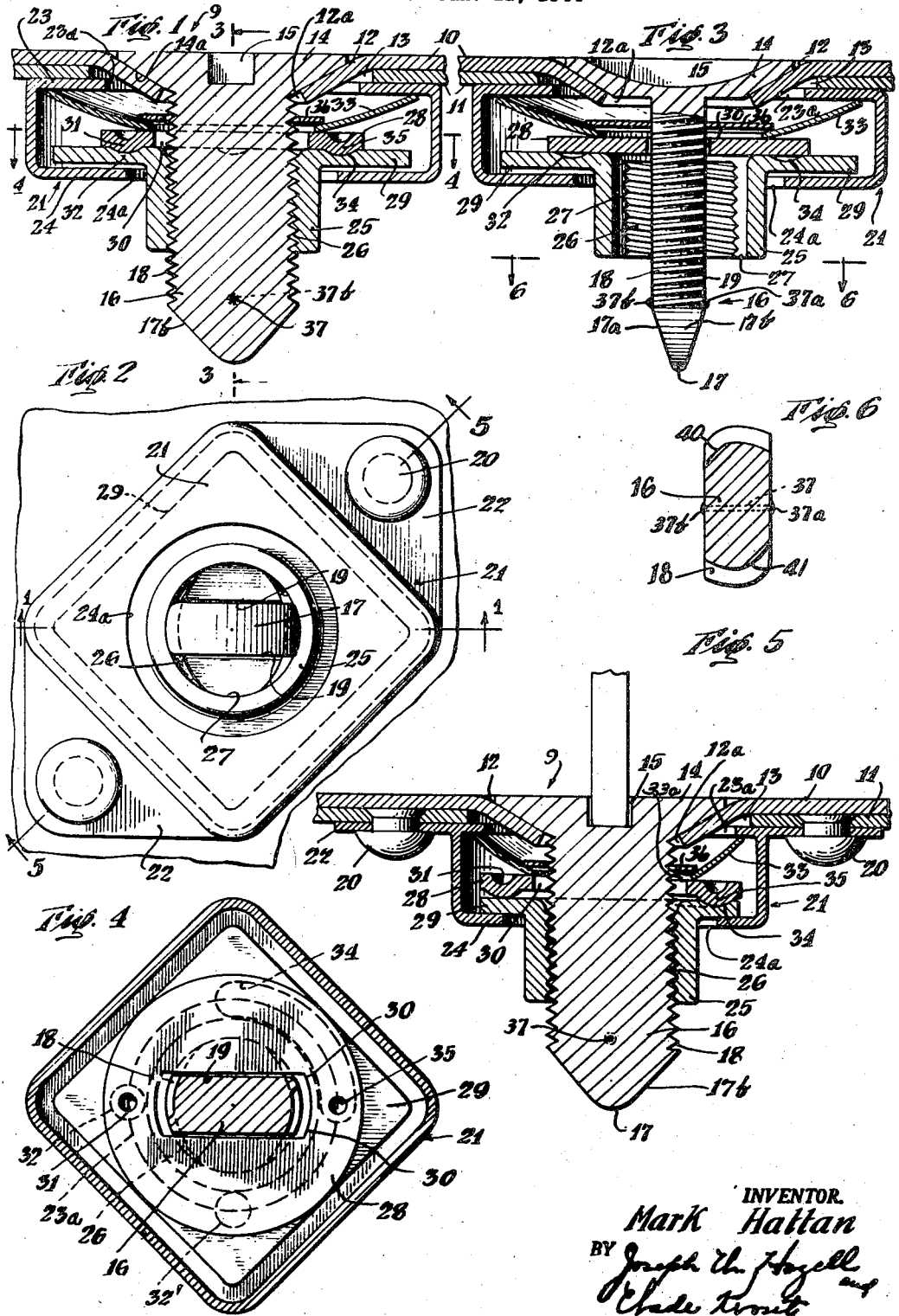
INVENTOR.
Mark Hattan
BY
ATTORNEYS Patented Nov. 5, 1946

2,410,441

UNITED STATES PATENT OFFICE 2,410,441

FASTENER ASSEMBLY

Mark Hattan, Dayton, Ohio

Application January 11, 1944, Serial No. 517,803

33 Claims. (Cl. 24—221)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a fastener assembly to be employed to securely fasten members such as sheets, one to the other and so that they will normally be free of relative movements. At the same time, the fastener will permit of a ready detachment of these members when such detachment is desired.

It is an object of the invention to furnish an assembly of this character in which the several parts may be adjusted with minimum effort and in a manner such that the members with which they are associated will be retained immovably with respect to each other.

A further object is that of designing a fastener assembly, the parts of which may readily be freed from each other when detachment of the members is desired.

An additional object is that of furnishing a structure of this type and in which, when the parts are once coupled, an accidental detachment of those parts will be substantially precluded.

A still further object is that of providing a fastener of a universal type adaptable to fastening parts of varying thickness or size and without the need of the user of the fastener adjusting any parts at the time of the fastening operation.

Another object is to provide a fastener of the above type in which certain of the cooperating elements are floatingly secured to one of the members, such as sheets, to be fastened together, said floating elements being self-centering with respect to another cooperating element adapted to be interlockingly engaged with the floating elements for securing the members, such as sheets, together.

Another object is to provide a fastener of this type in which means is provided for audibly signaling the locked and unlocked conditions of the cooperating elements.

Another object of the invention is to provide a fastener of the character referred to having a maximum of strength per unit weight or size.

Another object is that of furnishing a structure of this nature which will include relatively few parts, each individually simple and rugged in design, these parts being capable of ready manufacture by quantity production methods and being thereupon susceptible to assemblage by a simple procedure to furnish a unit which will operate over long periods of time with freedom from all difficulties.

With these and other objects in mind, reference is had to the attached sheet of drawings illustrating one practical embodiment of the invention, and in which:

Fig. 1 is a sectional side view of a fastener assembly taken on the line 1—1 of Fig. 2 and showing the parts in fully locked condition;

Fig. 2 is a bottom plan view thereof;

Fig. 3 is a transverse sectional view taken along the lines 3—3 and in the direction of the arrows as indicated in Fig. 1;

Fig. 4 is a sectional view taken along the lines 4—4 and in the direction of the arrows as also indicated in Fig. 1;

Fig. 5 is a sectional view taken on the line 5—5 of Fig. 2 showing the parts in a position in which the detent or projection 31 is riding on the plate 23 intermediate the recesses 32 and 32';

Fig. 6 is a transverse sectional plan view taken along the lines 6—6 and in the direction of the arrows as indicated in Fig. 3.

Throughout the several views, the fastener assembly has been shown in association with sheets of material 10 and 11; it being assumed that these sheets are to be secured against movement with respect to each other. It will be appreciated that such illustration is merely illustrative and not to be taken in a limiting sense, in that the fastener might readily be associated with various other types of members for the same purpose.

In any event, members to be coupled will be formed with apertures or recesses to receive the parts of the assembly and in the case of sheets the outermost should preferably be "dimpled" as indicated at 12. This dimpling defines the aperture 12a of sheet 10 while the aperture 13 of sheet 11 may simply be a circular opening. By such a construction, the depressed portion or dimple 12 may extend into and, in fact, beyond the plane of the sheet 11, and the head 14 of the operating stud 9 of the assembly may be substantially housed within the depressed portion provided by the dimple 2.

It is preferred that a stud, in accordance with the teachings of the present invention, include a head portion 14 which may be formed with a recess or groove 15 of any desired configuration to receive one of a number of suitable operating implements, and by means of which it may be turned. The under face 14a of the head 14 is preferably flared to extend at an angle corresponding to that of the dimpling 12 and so that a face-to-face contact of these parts results. The shank 16 of the stud 9 conveniently has its end portion tapered, as indicated at 17a and 17b, to substantially a point, as indicated at 17, to provide a guide structure for the stud. Moreover, the stud 9 presents a relatively narrow and flattened shank portion 16, the side edges of which are threaded as indicated at 18, while the side faces 19 thereof are plane and preferably flattened as seen in Fig. 3.

Secured to one of the sheets or members 11 is retaining means for cooperation with the stud 9 to secure sheets 10 and 11 together. Said retaining means includes a supporting member or housing 21, locking means comprising a nut 25 floatingly carried by the supporting member 21 and interlockingly cooperable with the stud 9, a lock member 28, and spring or resilient means 33. The housing 21 is secured to the under face of the sheet or member 11 by, for example, rivets 20. Conveniently, the housing 21 may be provided with flanges or ear portions 22 to furnish mountings for the rivets. The sheet engaging face 23 of the housing 21 may be formed with a circular opening 23a concentrically disposed with reference to the opening 13. The opposite face 24 of the housing 21 may be formed with an opening 24a.

Extending through the latter opening 24a and preferably beyond the housing 21 is a nut 25 formed with threads as indicated at 26. The diameter and pitch of these threads is such that they may cooperate with the threads 18 of the shank 16. Also, as shown in Fig. 6, the threads 18 may be reduced at points 40 and 41 adjacent their leading edges. As shown in Fig. 6, this reduction at the leading edge of the thread is made at the root of the thread as well as the top of the thread. In any event, this will result in ready cooperation of the thread portions of the stud 9 and nut 25. The threads 26 are interrupted by longitudinal grooves 27 in the nut 25, as shown especially in Fig. 3.

The grooves or interrupted portions 27 of the nut 25 are of a sufficient depth to loosely receive the broadest transverse dimension of the stud shank 16 and said grooves 27 will, therefore, receive the threads 18 of the shank 16 when the threaded edges of the latter are aligned with said grooves 27 and the shank 16 is inserted within the bore of the nut 25; under such conditions, of course, with the shank 16 inserted within the bore of the nut 25, the shank and nut may be freely moved axially with respect to one another. When however, the shank 16 is inserted within the bore of the nut 25, as just described, and the shank 16 and nut 25 are rotated relative to one another, it will be obvious that the threads 18 of the stud shank 16 will become interengaged with the threads 26 of the nut 25 to restrain relative axial movements of the stud 9 and nut 25.

Now with a view to providing means which will prevent or restrain relative turning movements of the shank 16 with respect to the nut 25 when the parts have been adjusted to proper position with the stud and threads interengaged, it will be observed that a lock member comprising a plate 28 is supported upon the flange 29 which extends from a point adjacent the inner edge of the nut body 25 at an angle thereto. The juncture of the flange 29 with nut body 25 provides an angular portion forming a part of the nut 25 and extending between the nut body and the flange. This plate 28, as especially shown in Fig. 4, is formed with an opening 30 of a configuration generally corresponding to the shank 16. This opening 30, however, is preferably of a sufficiently large area that a loose fit between the parts 28 and 16 is assured. Accordingly, with the plate 28 disposed upon the flange 29 of the nut 25 and the opening 30 aligned with the grooves or interrupted portions 27 of the threads 26, the stud 9 may freely be inserted into and withdrawn from the assembly.

A detent structure is furnished by conveniently striking out a projection or rib 31 from the under face of the plate 28 and forming the upper face of the flange 29 with a pair of recesses 32 and 32' adapted to receive the projection 31. A spring 33 may be interposed between the plate 28 and the inner face of flange 23 of the housing 21, thus constantly urging the plate 28 into contact with the flange 29. In order to prevent sidewise displacement of the plate 28 with reference to the nut 25, a guide structure is furnished. This structure may conveniently include a groove 34 of arcuate configuration and formed in the upper or outer face of flange 29. A projection or tab 35, also conveniently formed by indenting the plate 28, rides within this groove 34. It is thus apparent that sidewise displacement of the plate 28 with reference to the nut 25 is prevented, although rotation of these parts relative to each other may occur. Additionally, this structure serves a function somewhat in the nature of a stop element. In other words, the limits of the groove define the limits of movement of the projection 31 when it is in registry with either of the recesses 32 or 32'.

Thus when plate 28 is rotated relative to the nut 25 so that the projection 31 is engaged in the recess 32', the opening 30 will be aligned with the grooves 27 to permit insertion of shank 16 through the plate 28 and within and axially of the bore of the nut 25. When, thereafter, the shank 16 is rotated relative to nut 25 to engage the threads 18 and 26, the plate 28 will likewise be rotated, by the shank 16 engaging the correspondingly formed opening 30, until the projection 31 engages in the recess 32, as seen in Fig. 4, whereupon, it will be noted, the shank and nut threads 18 and 26 will be fully cooperatively engaged. At all times, during relative rotation of the nut 25 and plate 28, the projection 35 on the latter rides in the groove 34, serving to prevent sidewise displacement of the plate 28 relative to the nut 25. Thus with the construction as illustrated, it is apparent that when the projection 31 is engaged with one of the recesses 32 or 32', the opening 30 will either be in substantial registry with the interrupted portions 27 of the thread 26 or in a position substantially 90° out of registry with such interrupted portions.

If desired, means may be provided for retaining the stud 9 in association with the sheet 10 when the sheets 10 and 11 are to be separated upon release of interlocking cooperation of the stud 9 and nut 25. As illustrated, such means may comprise a washer or like member 36 non-rotatably mounted on the shank 16 of the stud for movement axially of the shank 16; and a pin, or the like, 37 may be inserted through a suitable hole drilled transversely through the shank 16 and peened over against the opposed unthreaded sides of the shank 16 to provide slight protrusions or ear portions 37a and 37b extending from the unthreaded sides of the shank 16 and integral therewith. The protrusions 37a and 37b will pass through the opening 30 in the lock member 28 and through the opening 33a in the spring 33, so as to permit the stud 9 to be withdrawn therefrom, but said protrusions 37a and 37b will not pass through the opening in the washer 36 which more closely fits the stud shank 16. Thus the stud 9 will be retained in association with the sheet 10, upon release of interlocking coöperation of the shank 16 and nut 25, by engagement of the protrusions 37a and 37b with the washer 36, upon axial movement of the stud relative thereto, and by engagement of the washer 36 with the adjacent side of the member 10.

In employing a fastener assembly of this type and as before brought out, the housing 21 mounting the nut 25 and its associated parts is preferably associated with the sheet or member 11 and with its opening 23a in substantial alignment with the aperture 13. As shown, the opening 24a in the housing 21, is relatively larger than the circumference of the nut 25, and the nut flange 29 is slightly smaller than the interior of the housing 21, to accommodate a limited lateral shifting of the nut 25 and plate 28 assembly to enable proper alignment or centering of the opening 30 and bore of the nut 25 with the opening 12a whereby to permit insertion of the shank 16 through same into the bore of the nut 25. The flange 29 is substantially square so as to substantially conform to the interior configuration of the housing 21 so that only a very limited degree of relative rotation of the nut 25 and housing 21 is possible. The stud 9 is introduced through the opening 12a defined by the dimple 12 in sheet 10. If the parts are not in perfect registry, the locking member 28 and nut 25 assembly may shift laterally within the housing 21 as the stud is introduced. This will occur because the nose portion 17 will cam against the end edges of the opening 30 of the plate 28. The locking member 28 and nut 25 assembly is sufficiently loosely mounted within the housing that a limited amount of shifting may occur. In other words, the structure is self-centering. Continued projection of the shank will cause the latter to enter the opening 30, as well as the bore of the nut 25. In the passage of the shank 16 within the bore of the nut 25, the threads 18 will, of course, ride within the grooves or interrupted portions 27 of the nut threads 26. As the head 14 comes to rest within the dimple and with the sheets 10 and 11 or other members in proper contact, further penetrative movement of the stud 9 will cease. Thereupon, the operator, by simply introducing a proper implement or tool into the slot 15 or its equivalent, may turn the stud 9 with reference to the nut 25 so that the shank threads 18 are caused to engage the nut threads 26.

During the entire foregoing operation, it will be understood that sidewise displacement of the plate 28 with reference to the nut 25 is prevented by the guide structure which has been previously described. A rotation of the stud 9 will result in the projection 35 riding within the groove 34. Also, it will result in the projection 31 riding out of one of the recesses 32 or 32' as particularly shown in Fig. 5. Under these circumstances, the detent function and structure will become inoperative. Therefore, no restraint will be placed upon the rotation of the plate 28 with reference to the nut. The detent will, however, again become operative when the projection 31 rides into the second recess 32. In that position, as seen in Figs. 1 and 3, and with the parts as shown, the threads 18 of the stud 9 will be midway between the interruptions 27 and in engagement with the threads 26. Thus, the parts will be firmly clamped. To release this engagement, a reverse operation is resorted to.

From the foregoing it will be apparent that, with the parts assembled as shown, the lock member 28 may be releasably locked in either of two positions. In one of these positions, the opening 30 is aligned with the grooves 27 of the nut 25, permitting the insertion of the stud shank 16 into the bore of the nut 25. In this position the projection 31 is engaged in the recess 32' with sufficient force by the action of the spring 33 to positively maintain the locking member 28 against accidental rotation relative to the nut 25, and the assembly is thus maintained ready to receive the stud 9. When the stud shank 16 is inserted through the opening 30 into the bore of the nut 25 and thereafter the shank 16 is rotated until the projection 31 engages in the recess 32, the lock member becomes locked in its second locked position, at which time it will be apparent that the shank threads 18 will be fully engaged with the nut threads 26 to restrain relative axial movements of the stud 9 and nut 25, and also at such time the engagement of the projection 31 with the recess 32 will, due to the action of the spring 33, positively restrain accidental relative rotation of the stud 9 and nut 25.

Thus there is provided a fastener construction which requires merely insertion of the stud axially into proper relation with the retaining means and subsequent 90° rotation of the stud from the position of insertion in order to positively lock together the members, such as sheets 10 and 11, with which the fastener construction of the invention is used. In the use of the invention the lock member 28 is readily locked in position ready to permit insertion of the stud and after the stud is inserted the lock member is readily locked in a position retaining the stud in place for locking the members together. Whenever the locking member 28 is rotated to stud receiving position or to stud locking position, the existence of either of these conditions of the structure is made readily apparent to the operator by the loud click occurring when the projection 31 is received in the respective recesses 32 or 32'. This audible signaling feature of the construction enable the operator to be assured that the device is in the desired stud receiving or stud locking condition.

From the foregoing, it will be understood that, among others, the several objects of the invention as specifically aforenoted are achieved. Obviously, numerous changes in construction and rearrangments of the parts might be resorted to without departing from the spirit of the invention as defined by the claims.

I claim:

1. A fastener comprising a receptacle, a nut mounted within said receptacle, a locking plate associated with said nut and contained within said receptacle, a resilient locking element positioned in said receptacle and in operative engagement with said plate, a locking stud adapted to be inserted through said member and plate into cooperative engagement with said nut, means for locking said plate and stud in locking relation relative to said receptacle when said stud is turned, and means for limiting the turning movement of said stud.

2. A fastener device of the type adapted to secure plates together detachably, comprising a receptacle and means for securing said receptacle to one of said plates, a nut loosely mounted within said receptacle, a locking plate provided with a stud receiving opening mounted within said receptacle and in engagement with said nut, a resilient locking element positioned within said receptacle and constructed and arranged to bias said plate into engagement with said nut, a locking stud adapted to be inserted through another of said plates and through said member and plate into engagement with said nut, the cross-section of said stud conforming substantially with the shape of said opening in said locking plate, means on said plate for effecting locking cooperation between said stud, plate and nut when said stud and plate are turned relative to said receptacle, and means for limiting the turning movement of said stud and plate.

3. A fastener device of the type adapted to secure plates together detachably, comprising a receptacle and means for securing said receptacle to one of said plates, a nut loosely mounted within said receptacle and provided with a recess, a locking plate provided with a stud receiving opening mounted within said receptacle and in engagement with said nut, a locking stud adapted to be inserted through another of said plates and through said member and locking plate into engagement with said nut, the cross-section of said stud conforming substantially with the shape of said opening in said locking plate, detent means on said locking plate adapted to engage said recess in said nut for effecting locking cooperation between said stud and locking plate when turned relative to said receptacle, and means for limiting the turning movement of said stud and locking plate.

4. A fastener device for use in securing together a plurality of plates comprising a receptacle, a nut mounted within said receptacle for lateral shifting movement relative thereto, means on said nut preventing rotation thereof in said receptacle, a turnable locking plate, a spring located in said receptacle and constructed and arranged to urge said plate against said nut, a locking stud having an interrupted thread adapted to be inserted through said spring and plate for engagement with said nut, said plate and nut having openings conforming substantially with the cross-section of said stud, means on said plate and operative when said plate has been turned by said stud for securing said stud in locked position in said nut relative to said receptacle, and means on said plate limiting turning movement of said plate and stud into locking position.

5. A fastener device for use in detachably securing together a plurality of separable members, comprising a receptacle, means for attaching said receptacle to one of said members, a nut having a non-circular flange loosely mounted in said receptacle with a portion of said nut extending beyond said receptacle, said flange of said nut being furnished with recesses, and said flange being of a shape to prevent rotation of said nut in said receptacle, a locking stud having an interrupted thread, means for securing said stud for turning movement in said other of said plates, a locking plate located in said receptacle, locking detents on said plate constructed and arranged to coact with said recesses, said stud and said nut being provided with openings conforming substantially in shape to the cross-section of said stud, a bowed flat spring secured within said housing and pressing said plate against said flange of said nut, said spring having an opening through which said stud may be inserted, and means on said plate for limiting the turning movement of said stud and plate when said detents are in locking engagement with said recesses.

6. A fastener device of the type adapted to secure plates together detachably, comprising a receptacle and means for securing said receptacle to one of said plates, a nut carried by said receptacle, a locking plate provided with a stud receiving opening mounted within said receptacle and in engagement with said nut, a resilient locking element positioned within said receptacle and constructed and arranged to bias said plate into engagement with said nut, a locking stud adapted to be inserted through another of said plates and through said member and plate into engagement with said nut, the cross-section of said stud conforming substantially with the shape of said opening in said locking plate, means on said plate for effecting locking cooperation between said stud, plate and nut when said stud and plate are turned relative to said receptacle, and means for limiting the turning movement of said stud and plate.

7. A fastener device of the type adapted to secure plates together detachably, comprising a receptacle and means for securing said receptacle to one of said plates, a nut loosely mounted within said receptacle and provided with a recess, a locking plate provided with a stud receiving opening mounted within said receptacle and in engagement with said nut, a locking stud adapted to be inserted through another of said plates and through said member and locking plate into engagement with said nut, the cross-section of said stud conforming substantially with the shape of said opening in said locking plate, means on said locking plate adapted to engage said nut for effecting locking cooperation between said stud and locking plate when turned relative to said receptacle, and means for limiting the turning movement of said stud and locking plate.

8. A fastener device for use in securing together a plurality of members comprising a receptacle, a nut carried by said receptacle, a turnable locking plate in said receptacle, a spring located in said receptacle and constructed and arranged to urge said plate against said nut, a locking stud having an interrupted thread adapted to be inserted through said spring and plate for engagement with said nut, said locking plate and nut having openings conforming substantially with the cross-section of said stud, means on said locking plate and operative when said locking plate has been turned by said stud for securing said stud in locked position in said nut relative to said receptacle, and means on said locking plate limiting turning movement of said locking plate and stud into locking position.

9. A fastener device for use in detachably securing together a plurality of separable members, comprising a receptacle, a nut carried by said receptacle, said nut being furnished with recesses, a locking stud having an interrupted thread, means for securing said stud for turning movement in one of said members, a locking plate located in said receptacle, locking detents on said plate constructed and arranged to coact with said recesses, said stud and said nut being provided with openings conforming substantially in shape to the cross-section of said stud, a bowed flat spring secured within said housing and pressing said plate against said nut, said spring having an opening through which said stud may be inserted, and means on said plate for limiting the turning movement of said stud and plate when said detents are in locking engagement with said recesses.

10. A fastener device of the type adapted to secure separable members together detachably, comprising a receptacle and means for securing said receptacle to one of said members, a nut loosely mounted within said receptacle, a locking plate provided with a stud receiving opening mounted within said receptacle and in engagement with said nut, a resilient locking element positioned within said receptacle and constructed and arranged to bias said locking plate into engagement with said nut, a locking stud adapted to be inserted through another of said members and through said element and locking plate into engagement with said nut, the cross-section of said stud conforming substantially with the shape of said opening in said locking plate, means on said locking plate for effecting locking cooperation between said stud, locking plate and nut when said stud and locking plate are turned relative to said receptacle, said last-named means producing an audible click when moving into or out of locking engagement with said nut, and means for limiting the turning movement of said stud and locking plate.

11. A fastener device for use in securing together a plurality of plates comprising a receptacle, a nut mounted within said receptacle, a turnable locking plate, a spring located in said receptacle and constructed and arranged to urge said locking plate against said nut, a locking stud having an interrupted thread adapted to be inserted through said spring and locking plate for engagement with said nut, said locking plate and nut having openings conforming substantially with the cross-section of said stud, means on said locking plate and operative when said locking plate has been turned by said stud for securing said stud in locked position in said nut, means on said locking plate limiting turning movement of said plate and stud into locking position, and other means on said plate limiting turning movement of said plate and stud into unlocking position.

12. A fastener device of the type adapted to secure plates together detachably, comprising a receptacle and means for securing said receptacle to one of said plates, a nut carried by said receptacle and provided with a plurality of sets of recesses, a locking plate provided with a stud receiving opening also carried by said receptacle and in engagement with said nut, a locking stud adapted to be inserted through another of said plates and through said member and locking plate into engagement with said nut, detent means on said locking plate adapted to engage one of said sets of recesses for effecting locking cooperation between said stud and locking plate when turned relative to said receptacle, and to engage another set of recesses in said nut when said stud and locking plate are turned in the opposite direction to unlocking position, means for limiting the turning movement of said stud and locking plate into locking position, and other means for limiting the turning movement of said stud and locking plate into unlocking position.

13. In a fastener assembly, a headed stud including a shank formed with interrupted threads, said shank being adapted to extend through the aperture of a mounting member, retaining means mounted by said shank and to bear against the face of said mounting member to prevent removal of said stud therefrom, a tongue forming a part of said retaining means and extending adjacent said shank, a projection extending from the latter and engageable by said tongue; said retaining means with the tongue displaced to clear said projection passing beyond said shank.

14. A stud-receptacle assembly for a fastener, said assembly including a nut, a housing formed with an opening through which said nut projects, a flange member extending from said nut and within said housing, a plate member rotatably mounted by said flange and formed with a slot to permit passage of a stud shank, one of said members being formed with recesses, and ribs extending from the second of said members and into said recesses to restrain relative rotation of said members when the latter are in predetermined positions.

15. A stud-receptacle assembly for a fastener, said assembly including a housing formed with an opening, a nut body projecting through said opening, a flange and an angular portion forming a part of said nut, said angular portion extending between the body and said flange, and a locking plate rotatably supported upon the flange of said nut and presenting a body lying adjacent the angular portion thereof.

16. A stud-receptacle assembly for a fastener, said assembly including a housing formed with an opening, a nut body projecting through said opening, a flange and an angular portion forming a part of said nut, said angular portion extending between the body and said flange, a locking plate rotatably supported upon the flange of said nut, and presenting a body lying adjacent the angular portion thereof, and detent means cooperating with said plate and nut to normally maintain the latter in predetermined positions with respect to each other.

17. A stud-receptacle assembly for a fastener, said assembly including a housing formed with an opening, a nut body projecting through said opening, a flange and an angular portion forming a part of said nut, said angular portion extending between the body and said flange, and a locking plate rotatably supported upon the flange of said nut, and presenting a body lying adjacent the angular portion thereof, both said nut and plate being slotted to permit of the passage of a stud shank, and detent means cooperating with said plate and nut to normally maintain the latter in predetermined positions with respect to each other.

18. A fastener assembly including in combination a stud member comprising a flattened shank formed with screw threads in its outer edges, a nut including a body and a detent plate rotatably mounted by said body, said plate being formed with a slot permitting the passage of said shank but preventing relative rotation of the shank with respect to the same, said nut being formed with interruptions in its threads, and ribs and cooperating recesses formed in said plate and nut to prevent relative rotation of the same.

19. A stud-receptacle assembly for a fastener, said assembly including, in combination, a nut member, a lock plate member rotatably supported thereon, a tab extending from one of said members, the second of said members being formed with an arcuate recess and within which said tab rides, and said tab, in conjunction with the end walls of said recess, providing a stop structure limiting the rotational movement of said plate member with respect to said nut member.

20. A stud-receptacle assembly for a fastener, said assembly including, in combination, a nut member, a lock plate member rotatably supported thereon, a tab extending from one of said members, the second of said members being formed with an arcuate recess and within which said tab rides, said tab, in conjunction with the end walls of said recess, providing a stop structure limiting the rotational movement of said plate member with respect to said nut member, one of said members being formed with recesses, and ribs forming a part of the second of said members and extendable into said grooves to provide a detent structure.

21. A stud-receptacle assembly for a fastener, said assembly including, in combination, a nut member, a lock plate member rotatably supported thereon, a tab extending from one of said members, the second of said members being formed with an arcuate recess and within which said tab rides, said tab, in conjunction with the end walls of said recess, providing a stop structure limiting the rotational movement of said plate member with respect to said nut member, one of said members being formed with recesses, ribs forming a part of the second of said members and extendable into said recesses to provide a detent structure, a shell formed with an opening through which said nut member extends, a spring bearing against said plate to cause the latter to engage said nut and to also cause said nut to bear against said shell, and inwardly extending flange portions forming a part of said shell and supporting said spring.

22. A stud-receptacle assembly for a fastener, said assembly including, in combination, a nut member, a lock plate member rotatably supported thereon, a tab extending from one of said members, the second of said members being formed with an arcuate recess and within which said tab rides, said tab, in conjunction with the end walls of said recess, providing a stop structure limiting the rotational movement of said plate member with respect to said nut member, one of said members being formed with recesses, ribs forming a part of the second of said members and extendable into said recesses to provide a detent structure, a shell formed with an opening through which said nut member extends, a spring bearing against said plate to cause the latter to engage said nut and to also cause said nut to bear against said shell, spacing means associated with said shell, said spring bearing against said spacing means, and means for securing said spacing means and shell against movements with respect to each other.

23. In a fastener assembly, in combination, a nut member, a lock plate member rotatably supported thereon, a tab extending from one of said members, the second of said members being formed with an arcuate recess and within which said tab rides, said tab, in conjunction with the end walls of said recess, providing a stop structure limiting the rotational movement of said plate member with respect to said nut member, a stud to extend through an opening in said plate and into the bore of said nut, integral ear portions forming a part of said stud and extending beyond the body of the same, and stud-retaining means slidably mounted upon said stud and secured against displacement with respect to the same by said ears.

24. A stud-receptacle assembly for a fastener, said assembly including, in combination, a nut member, a lock plate member rotatably supported thereon, one of said members having an arcuate recess, and a tab extending upwardly from the other of said members and integral therewith to lie within said recess and, in cooperation with the end edges thereof, to limit rotational movements of said nut and lock plate.

25. A stud-receptacle assembly for a fastener, said assembly including, in combination, a nut, a lock plate rotatably supported thereon, said nut being formed with a series of recesses, ribs projecting from the adjacent face of the plate, and means for causing cooperation between said recesses and ribs to provide a detent structure.

26. In a fastener assembly, a stud receptacle formed with an opening, a nut disposed within said receptacle and extending through said opening, said nut being formed with interrupted screw threads, a plate rotatably mounted with respect to said nut and formed with a slot through which the shank of a stud may project, and stop means for preventing rotation of said plate with respect to said nut and beyond predetermined positions.

27. In a fastener assembly, a stud receptacle formed with an opening, a nut disposed within said receptacle and extending through said opening, said nut being formed with interrupted screw threads, a plate rotatably mounted with respect to said nut and formed with a slot through which the shank of a stud may project, stop means for preventing rotation of said plate with respect to said nut and beyond predetermined positions, and detent means forming a part of said plate and nut for restraining relative rotation of the same.

28. In a fastener assembly, a headed stud including a shank formed with interrupted threads, said shank being adapted to extend through the aperture of a mounting member, and retaining means mounted by said shank and to bear against the face of said mounting member to prevent removal of said stud therefrom.

29. A stud-receptacle assembly for a fastener, said assembly including a housing, a nut projecting from said housing and movable within the same, a spring acting against said nut to normally maintain the same in predetermined position within said housing, the ends of said spring being normally spaced from the inner edge faces of said housing, and said spring when said nut is engaged by a stud being moved with respect to said housing.

30. A fastener device comprising a receptacle, a flanged nut mounted in said receptacle and projecting outwardly therefrom through an opening in said receptacle, stop means on the flange of said nut, a locking plate, a spring within said receptacle pressing said plate against said flange, a locking stud adapted to be inserted through said spring, and plate for engagement with the threads of said nut, and a projection on the edge of said plate constructed and arranged to engage said stop means to prevent further turning movement of said stud and plate relative to said flange when said stud and plate have been moved to locking position.

31. A fastener device of the type adapted to secure plates together detachably, comprising a receptacle and means for securing said receptacle to one of said plates, a nut loosely mounted within said receptacle, a locking plate provided with a stud receiving opening mounted within said receptacle and in engagement with said nut, a resilient locking element positioned within said receptacle and constructed and arranged to bias said plate into enegeagement with said nut, a locking stud adapted to be inserted through another of said plates and through said element and plate into engagement with said nut, the cross-section of said stud conforming substantially with the shape of said opening in said locking plate, means on said plate for effecting locking cooperation between said stud, plate and nut when said stud and plate are turned relative to said receptacle, means for limiting the turning movement of said stud and plate, said means including a flange formed on said locking plate, and means on said nut engaged by said flange for preventing turning movement of said stud.

32. A fastener device of the class described comprising, in combination a nut member, and a locking stud adapted for cooperation with said nut member, said nut member and stud having cooperating threads, and the threads on said stud member being reduced adjacent their leading edges.

33. A fastener device of the class described comprising, in combination a nut member, a receptacle adapted to receive said nut member, and a stud member for cooperation with said nut member, said nut and stud members having cooperating threads, the threads on said stud member being reduced at their leading edges at the root of the thread and at the top of the thread.

MARK HATTAN.